(12) United States Patent
Pereira et al.

(10) Patent No.: US 7,953,327 B2
(45) Date of Patent: May 31, 2011

(54) COMMISSIONING TOOL, COMMISSIONING SYSTEM AND METHOD OF COMMISSIONING A NUMBER OF WIRELESS NODES

(75) Inventors: Luis R. Pereira, Milwaukee, WI (US); Marco Naeve, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 861 days.

(21) Appl. No.: 11/860,653

(22) Filed: Sep. 25, 2007

(65) Prior Publication Data

US 2009/0080896 A1  Mar. 26, 2009

(51) Int. Cl.
*H04B 10/00* (2006.01)
(52) U.S. Cl. .................. 398/116; 398/117; 398/127
(58) Field of Classification Search .......... 398/115–117, 398/124–128
See application file for complete search history.

(56) References Cited

U.S. PATENT DOCUMENTS

| | | | |
|---|---|---|---|
| 6,218,782 B1 | 4/2001 | Mallalieu | |
| 7,167,777 B2 | 1/2007 | Budike, Jr. | |
| 7,211,968 B2 | 5/2007 | Adamson et | |
| 7,299,072 B2* | 11/2007 | Ninomiya | 455/562.1 |
| 2005/0007276 A1* | 1/2005 | Barrick et al. | 342/372 |
| 2008/0218087 A1* | 9/2008 | Crouse et al. | 315/131 |
| 2008/0218317 A1* | 9/2008 | Choi | 340/286.01 |
| 2008/0265782 A1* | 10/2008 | Crouse et al. | 315/158 |
| 2009/0066258 A1* | 3/2009 | Cleland et al. | 315/158 |

OTHER PUBLICATIONS

Reliability Direct, "Reliability Direct AR851 Ultrasonic Range Finder (with Laser Pointer)", http://www.reliabilitydirect.com/ultrasoundproducts/RDI-AR851. htm?gclid=ClbGkNOv9Y0CFQ9ZHgodEX5aL.w, 1999-2007, 2 pp.
Stanley Works Inc., "77-910—TLM 100 FatMax ™ Tru-Laser ™ Distance Measurer", http://www.stanleytools.com/default. asp?CATEGORY=LASER+MEASURING&TYPE=PRODUCT &PARTNUMBER=77-910&SDesc=TLM+100+FatMax ™+Tru-Laser™+Distance+Measurer, 2002-2007, 2 pp.
Wikimedia Foundation, Inc., "Ultrasonic ranging module", Wikipedia encyclopedia, http://en.wikipedia.org/wiki/Ultrasonic_ranging_module, Apr. 2007, 1 p.
EMANT Pte Ltd, "Measure Distance using the Ultrasonic Sensor.", http://www.emant.com/index.php?tid=100011, 2002-2007, 3 pp.
Wikimedia Foundation, Inc., "Global Positioning System", Wikipedia encyclopedia, http://en.wikipedia.org/wiki/GPS, Aug. 15, 2007, 22 pp.
Wikimedia Foundation, Inc., "Dead reckoning", Wikipedia encyclopedia, http://en.wikipedia.org/wiki/Dead_reckoning, Aug. 14, 2007, 3 pp.

(Continued)

*Primary Examiner* — Dzung D Tran
(74) *Attorney, Agent, or Firm* — Martin J. Moran

(57) ABSTRACT

A commissioning tool includes a laser pointer structured to reflect light from a wireless lighting ballast, a directive antenna, a ranging module structured to determine distance to the ballast, and a housing. The pointer, antenna and ranging module are each mounted in the same common orientation with respect to the housing. A 3D gyroscope determines azimuth angle and elevation angle of the same common orientation. A GPS and dead reckoning system determines the global position of the tool. A wireless transceiver cooperates with the antenna. A processor cooperates with the transceiver to receive a unique device identifier from the ballast. The processor receives the distance, the azimuth and elevation angles, and the global position of the tool, and controls the light source. The processor may output the distance, the azimuth and elevation angles, the global position of the tool and the unique device identifier to another processor.

23 Claims, 6 Drawing Sheets

OTHER PUBLICATIONS

Honeywell International Inc., "Magnetic Sensors Press Room", http://www.ssec.honeywell.com/magnetic/new/20050909_drm_demo.html, 2003, 2 pp.

Daintree Networks Inc., "Daintree Networks: Enabling the Internet of Things", http://www.daintree.net/index.php, 2004-2007, 2 pp.

Daintree Networks Inc., "Sensor Network Analyzer (SNA)", http://www.daintree.net/products/sna.php, 2004-2007, 7 pp.

Wikimedia Foundation, Inc., "Directional antenna", Wikipedia encyclopedia, http://en.wikipedia.org/wiki/Directional_antenna, Jul. 27, 2007, 2 pp.

Hyperlink Technologies, Inc., "2.4 GHz 14 dBi Backfire Wireless LAN Antenna Model: HG2414D", http://wwwv.hyperlinktech.com/web/hg2414d.php, 2007, 3 pp.

* cited by examiner

COMMISSIONING TOOL, COMMISSIONING SYSTEM AND METHOD OF COMMISSIONING A NUMBER OF WIRELESS NODES

BACKGROUND OF THE INVENTION

1. Field of the Invention

This invention pertains generally to wireless communications and, more particularly, to commissioning tools for a number of wireless nodes. The invention also pertains to commissioning systems for wireless nodes. The invention further pertains to methods of commissioning wireless nodes.

2. Background Information

A wireless lighting ballast typically includes a conventional lighting ballast and a wireless ballast control module, which connects and permits communication between another wireless node, such as a wireless lighting controller, and the wireless lighting ballast through wireless communications, such as through a wireless local area network (LAN). See, for example, U.S. Pat. Nos. 7,211,968; 7,167,777; and 6,218,782. In this manner, a number of lights of a lighting fixture can be turned on or off, or the lighting intensity thereof can be adjusted, through wireless communications from the wireless controller to the wireless ballast control module, which, in turn, applies suitable electrical signals to the conventional lighting ballast that powers the lights. The wireless ballast control module can either be integrated with the conventional lighting ballast or else be mounted externally.

One of the key challenges of a commercial or industrial wireless lighting ballast is to link the installed position of the wireless lighting ballast with its own internal identifier.

Known commissioning tools are believed to be too cumbersome for installing wireless lighting ballasts. For example, it can take up to about ten hours to identify about 400 wireless lighting ballasts (e.g., about 1.5 minutes per wireless lighting ballast). Such known commissioning tools are based on gathering a list of device identifiers (device IDs) (using a suitable discovery process) of the wireless lighting ballasts and, then, visually identifying the corresponding lighting fixtures (e.g., by sequentially blinking each of the lighting fixtures) to provide the association between each device ID and the corresponding lighting fixture physical location. For example, a known commissioning tool is in the form of a personal digital assistant (PDA), which interrogates the device ID out of the wireless lighting ballast. However, there is no correlation of the device ID with the corresponding location of the wireless lighting ballast/lighting fixture.

There is room for improvement in commissioning tools for wireless nodes.

There is also room for improvement in commissioning systems for wireless nodes.

There is further room for improvement in methods of commissioning wireless nodes.

SUMMARY OF THE INVENTION

These needs and others are met by embodiments of the invention, which provide a commissioning tool that accurately selects wireless nodes, and determines the unique device identifier and the global position thereof.

In accordance with one aspect of the invention, a commissioning tool is for a number of wireless nodes, each of the number of wireless nodes having a unique device identifier. The commissioning tool comprises: a light source structured to reflect light from one of the number of wireless nodes; a directive antenna; a first mechanism structured to determine distance to the one of the number of wireless nodes; a housing, the light source, the directive antenna and the first mechanism each being mounted in the same common orientation with respect to the housing; a second mechanism structured to determine azimuth angle and elevation angle of the same common orientation; a third mechanism structured to determine global position of the commissioning tool; a wireless transceiver cooperating with the directive antenna; and a processor cooperating with the wireless transceiver to receive the unique device identifier from the one of the number of wireless nodes, the processor being structured to receive the distance to the one of the number of wireless nodes from the first mechanism, to receive the azimuth angle and the elevation angle from the second mechanism, to receive the global position of the commissioning tool from the third mechanism, and to control the light source.

The processor may comprise a routine structured to determine the global position of the one of the number of wireless nodes from the distance to the one of the number of wireless nodes from the first mechanism, the azimuth angle and the elevation angle from the second mechanism, and the global position of the commissioning tool from the third mechanism.

The processor may further comprise an output; and the routine may be further structured to output the unique device identifier and the global position of the one of the number of wireless nodes to the output of the processor.

The processor may comprise a routine structured to control radio frequency power transmitted by the wireless transceiver to the directive antenna as a function of the distance to the one of the number of wireless nodes.

As another aspect of the invention, a commissioning system is for a plurality of wireless nodes, each of the wireless nodes having a unique device identifier. The commissioning system comprises: a commissioning tool comprising: a light source structured to reflect light from one of the wireless nodes, a directive antenna, a first mechanism structured to determine distance to the one of the wireless nodes, a housing, the light source, the directive antenna and the first mechanism each being mounted in the same common orientation with respect to the housing, a second mechanism structured to determine azimuth angle and elevation angle of the same common orientation, a third mechanism structured to determine global position of the commissioning tool, a wireless transceiver cooperating with the directive antenna, a first processor cooperating with the wireless transceiver to receive the unique device identifier from the one of the wireless nodes, the first processor being structured to receive the distance to the one of the wireless nodes from the first mechanism, to receive the azimuth angle and the elevation angle from the second mechanism, to receive the global position of the commissioning tool from the third mechanism, and to control the light source, and an output; and a second processor comprising: an input cooperating with the output of the commissioning tool to input the unique device identifier and the global position of the one of the wireless nodes, and a memory including the unique device identifier and the global position of each of a plurality of the wireless nodes.

As another aspect of the invention, a method commissions a number of wireless nodes, each of the number of wireless nodes having a unique device identifier. The method comprises: mounting each of a light source, a directive antenna and a ranging mechanism in the same common orientation with respect to a portable housing; reflecting light from one of the number of wireless nodes with the light source; determining distance to the one of the number of wireless nodes with the ranging mechanism; determining azimuth angle and elevation angle of the same common orientation; determining global position of the portable housing; requesting and receiving the unique device identifier from the one of the number of wireless nodes through the directive antenna; and outputting the distance to the one of the number of wireless nodes, the azimuth angle and the elevation angle, the global position of the portable housing, and the unique device identifier from the one of the number of wireless nodes.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
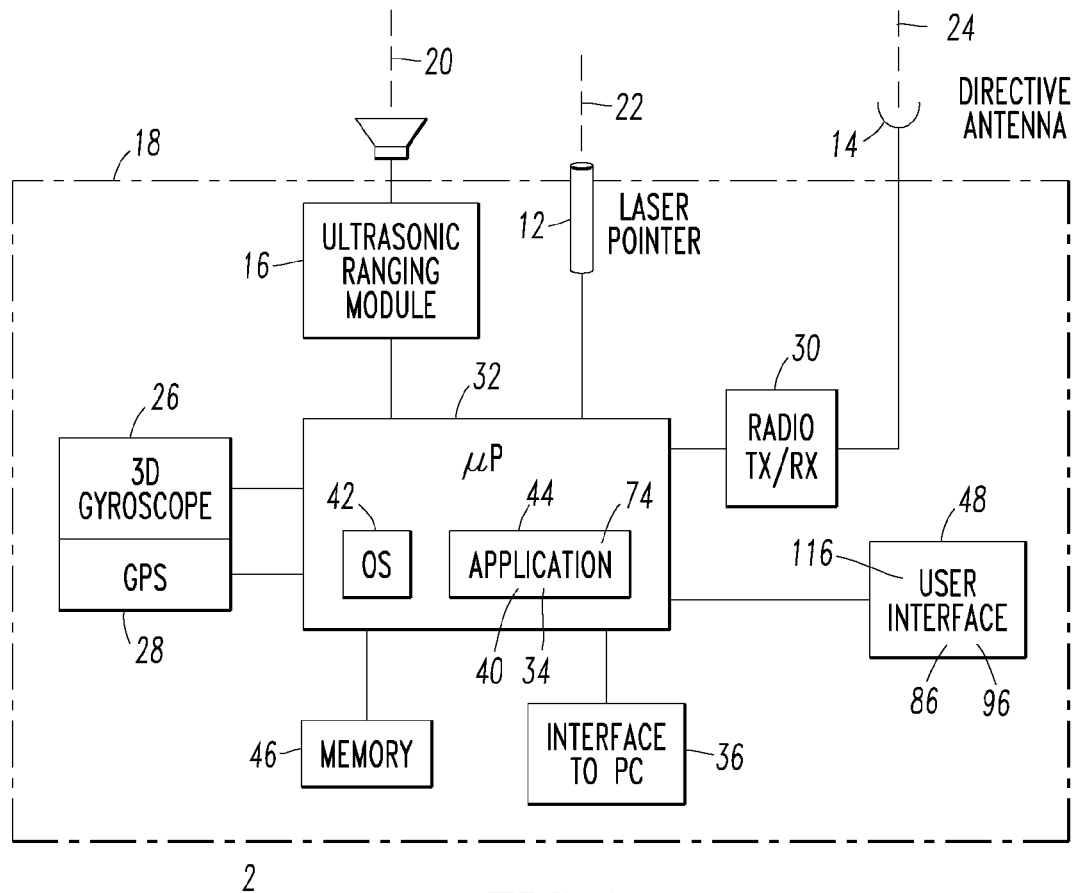
FIG. 1 is a block diagram of a commissioning tool in accordance with embodiments of the invention.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "global positioning system" or "GPS" means a system structured to determine a global position.

As employed herein, the term "global position" means latitude (e.g., the angle at the center of a coordinate system between any point on the Earth's surface and the plane of the Equator), longitude (e.g., the angle East or West, at the center of the coordinate system, between any point on the Earth's surface and the plane of an arbitrary North-South line between the two geographical poles) and elevation (e.g., the vertical position of a location relative to the center of a reference system or some definition of the Earth's surface, such as mean sea level or the Earth's center). Alternatively, the global position may be expressed as a relative position with respect to a known "zero point" or other suitable reference point. Hence, a position difference (latitude difference, longitude difference, elevation difference) may be determined from a wireless node to that known "zero point" or other suitable reference point. Those differences can be expressed, for example, in decimal degrees and/or distance (e.g., meters).

As employed herein, the terms "azimuth angle and elevation angle" mean, respectively, (a) azimuth angle (ranging from 0 degrees to 360 degrees) (or angular distance) as measured on a horizontal reference plane passing through a commissioning tool between the angular direction of a fixed reference point (e.g., without limitation, true North) and the angular direction of a line (or common orientation) pointing from the commissioning tool toward an elevated wireless lighting ballast (or lighting fixture), and (b) elevation angle (ranging from 0 degrees to 90 degrees) between a horizontal reference plane passing through the commissioning tool and a line (or common orientation) pointing from the commissioning tool toward the elevated wireless lighting ballast (or lighting fixture).

As employed herein, the term "same common orientation" means that lines (or local objects defining lines) point toward the same remote object, with such lines being parallel to each other.

As employed herein, the term "directive" means the same as "directional" or suitable for receiving radio signals from one direction (e.g., a line of a common orientation) or for transmitting radio signals in such one direction.

The invention is described in association with wireless light ballasts, although the invention is applicable to a wide range of other wireless applications, such as for example and without limitation, wireless temperature sensors monitoring bus-bar connection points in switchgear applications, wireless asset tracking applications, wireless motor bearing temperature sensors, or any wireless application deploying wireless nodes where the locations of the individual wireless nodes are important.

Referring to FIG. 1, a commissioning tool 2 is shown. As will be described, the commissioning tool 2 accurately selects wireless nodes, such as the example wireless lighting ballasts 4 (FIG. 4), collects device identifiers (device IDs 6) (FIGS. 3 and 4), and performs grouping of wireless lighting ballast global position and device ID while a user 8 (e.g., an installer) (FIGS. 3 and 4) "sweeps the room" containing lighting fixtures 10 (FIG. 4). It is believed that this can increase productivity over known commissioning tools by a factor of about ten.

The commissioning tool 2 includes a light source (e.g., without limitation, a laser guide, such as a laser pointer 12) structured to reflect light from one of the number of wireless lighting ballasts 4, a directive antenna (e.g., without limitation, a superdirective radio frequency (RF) antenna 14), a first mechanism 16 (e.g., without limitation, an ultrasonic ranging module) structured to determine distance to such one of the number of wireless lighting ballasts 4, and a housing 18. Preferably, the housing 18 is portable (e.g., without limitation, handheld; capable of being carried or moved about). The example laser pointer 12, the directive antenna 14 and the first mechanism 16 are each mounted in the same common orientation with respect to the housing 18. This common orientation is such that lines 20, 22 and 24 from the first mechanism 16, the laser pointer 12 and the directive antenna 14, respectively, point toward the same remote object (e.g., a selected one of the number of wireless lighting ballasts 4), with such lines being parallel to each other. For example, the line 20 represents the direction of ultrasonic emissions or ultrasonic reflections from or to the first mechanism 16, the line 22 represents laser light from the laser pointer 12, and the line 24 represents RF signals from or to the directive antenna 14.

A second mechanism 26 (e.g., without limitation, a 3D gyroscope) is structured to determine azimuth angle and elevation angle of the same common orientation of the lines 20,22,24. A third mechanism 28 (e.g., without limitation, a GPS and dead reckoning system) is structured to determine the global position of the commissioning tool 2. A wireless transceiver 30 cooperates with the directive antenna 14. A processor (e.g., without limitation, microprocessor (μP) 32) cooperates with the wireless transceiver 30 to receive the unique device identifier (ID) 6 from the selected one of the number of wireless lighting ballasts 4 of FIG. 4. The example μP 32 is structured to receive the distance to such one of the number of wireless lighting ballasts 4 from the first mechanism 16, to receive the azimuth angle and the elevation angle from the second mechanism 26, to receive the global position of the commissioning tool 2 from the third mechanism 28, and to control the example laser pointer 12.

The example laser pointer 12 provides visual feedback for the user to know precisely the single selected wireless lighting ballast 4. The example superdirective RF antenna 14 maximizes the probability that the selected wireless lighting ballast 4 answers a wireless device ID request inquiry 5 (FIG. 3) from the commissioning tool 2 and, thus, exchanges information with the selected wireless lighting ballast 4. The example ultrasonic ranging module 16 (e.g., ultrasound distance meter) measures the distance from the commissioning tool 2 to the selected wireless lighting ballast 4 (or the corresponding lighting fixture 10) (FIG. 4), in order to, for example, control RF power transmitted by the commissioning tool 2 (Examples 16-19, below). The relatively high directivity and power control permits the commissioning tool 2 to precisely select the single wireless lighting ballast 4, as indicated by the laser pointer 12. The example 3D gyroscope 26 determines the azimuth angle and elevation angle of the selected wireless lighting ballast 4 with respect to the commissioning tool 2, which azimuth angle and elevation angle are employed to determine the global position of such selected wireless lighting ballast, as will be described. The example indoor GPS and dead reckoning system 28 determines the global position of the commissioning tool 2 as the basis of determining the global position of the selected wireless lighting ballast 4.

EXAMPLE 1

Although not required, the μP 32 may include a routine 34 structured to determine the global position of the one of the number of wireless lighting ballasts 4 from the distance to such one of the number of wireless lighting ballasts from the first mechanism 16, the azimuth angle and the elevation angle from the second mechanism 26, and the global position (e.g., longitude, latitude and elevation) of the commissioning tool 2 from the third mechanism 28. The routine 34 is further structured to output the device ID 6 and the global position (e.g., longitude, latitude and elevation) of such one of the number of wireless lighting ballasts to an output 36.

EXAMPLE 2

As an alternative to Example 1, if the routine 34 cannot communicate through the output 36 (e.g., without limitation, another device is not connected to that output), then the routine 34 is further structured to store the device ID 6 and the global position (e.g., longitude, latitude and elevation) of such one of the number of wireless lighting ballasts in a suitable memory 46.

EXAMPLE 3

Figure 2:
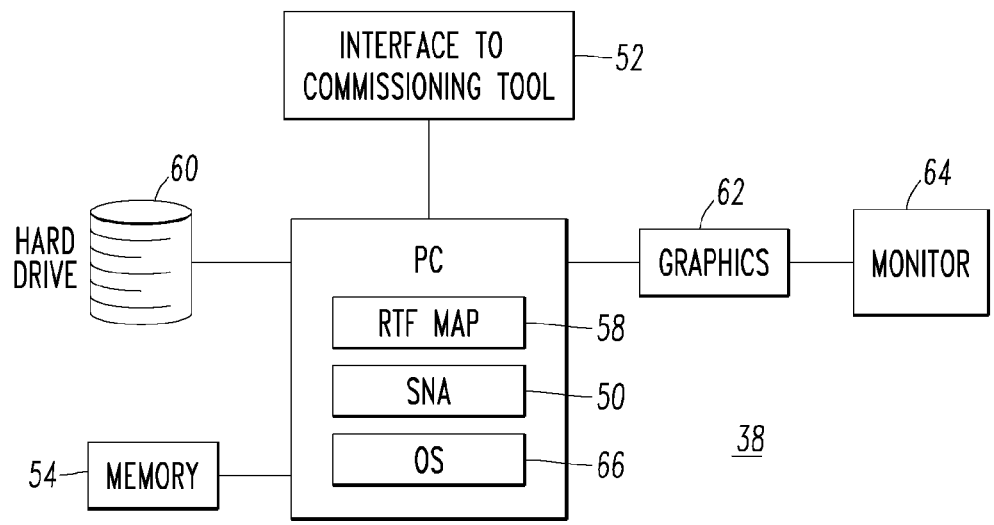
FIG. 2 is a block diagram of a personal computer including a sensor network analyzer (SNA) routine for use with the commissioning tool of FIG. 1.

The example μP output 36 is an interface (e.g., without limitation, serial; parallel; USB; WiFi; Bluetooth) to another processor, such as personal computer (PC) 38 (FIG. 2).

EXAMPLE 4

Preferably, the μP 32 includes a routine 40 structured to control RF power transmitted by the wireless transceiver 30 to the directive antenna 14 as a function of the distance to the selected one of the number of wireless lighting ballasts 4.

EXAMPLE 5

The μP 32 preferably also includes a suitable operating system (OS) 42, a number of application programs 44, the memory 46, and a suitable user interface 48 (e.g., input and output (e.g., display) apparatus).

EXAMPLE 6

FIG. 2 shows the PC 38, which includes a sensor network analyzer (SNA) routine 50, an input 52 cooperating with the output 36 of the commissioning tool 2 (FIG. 1) to input the unique device identifier 6 (FIG. 4) and the global position of the corresponding wireless lighting ballast 4, and a memory 54 including the device identifiers 6 and the corresponding wireless lighting ballast global positions of the various wireless lighting ballasts 4 of interest. When the input 52 and output 36 (FIG. 1) are suitably interconnected, the PC 38 and the commissioning tool 2 (FIG. 1) form a commissioning system 56 (FIG. 4).

The PC 38 may include, for example and without limitation, a real-time fixture (RTF) map 58, which includes the device identifiers 6 and the corresponding wireless lighting ballast global positions of the various wireless lighting ballasts 4 of interest, a suitable disk drive 60, a suitable graphics generator 62, a suitable display, such as a monitor 64, and a suitable operating system (OS) 66. For example, the wireless lighting ballast global positions and device IDs 6 can be fed to the SNA routine 50 to perform grouping, role definitions, metering and other wireless communication activities.

EXAMPLE 7

Alternatively, the PC 38 and the SNA routine 50 may employ the azimuth angle and elevation angle from the 3D gyroscope 26 of the commissioning tool 2, the longitude, latitude and elevation from the GPS and dead reckoning system 28 of the commissioning tool 2, and the distance between the commissioning tool 2 and the selected wireless lighting ballast 4 (or the corresponding lighting fixture 10) from the ultrasonic ranging module 16 to determine the global position (longitude, latitude and elevation) of such wireless lighting ballast 4. In turn, the SNA routine 50 provides the RTF map 58, which is created with the information provided by the commissioning tool 2. As a result, typical specific operations (identification and grouping (e.g., combining the functions of individual lighting fixtures into a larger operational group, e.g., all the lights within a room)) done by the user 8 (FIGS. 3 and 4) can be put into an easy to use layout (e.g., map of all discovered wireless ballasts and their physical locations), in order that such user can quickly do his/her job.

EXAMPLE 8

The example PC input 52 is an interface (e.g., without limitation, serial; parallel; USB; WiFi; Bluetooth) to another processor, such as the commissioning tool 2 (FIG. 1).

EXAMPLE 9

Figure 3A:
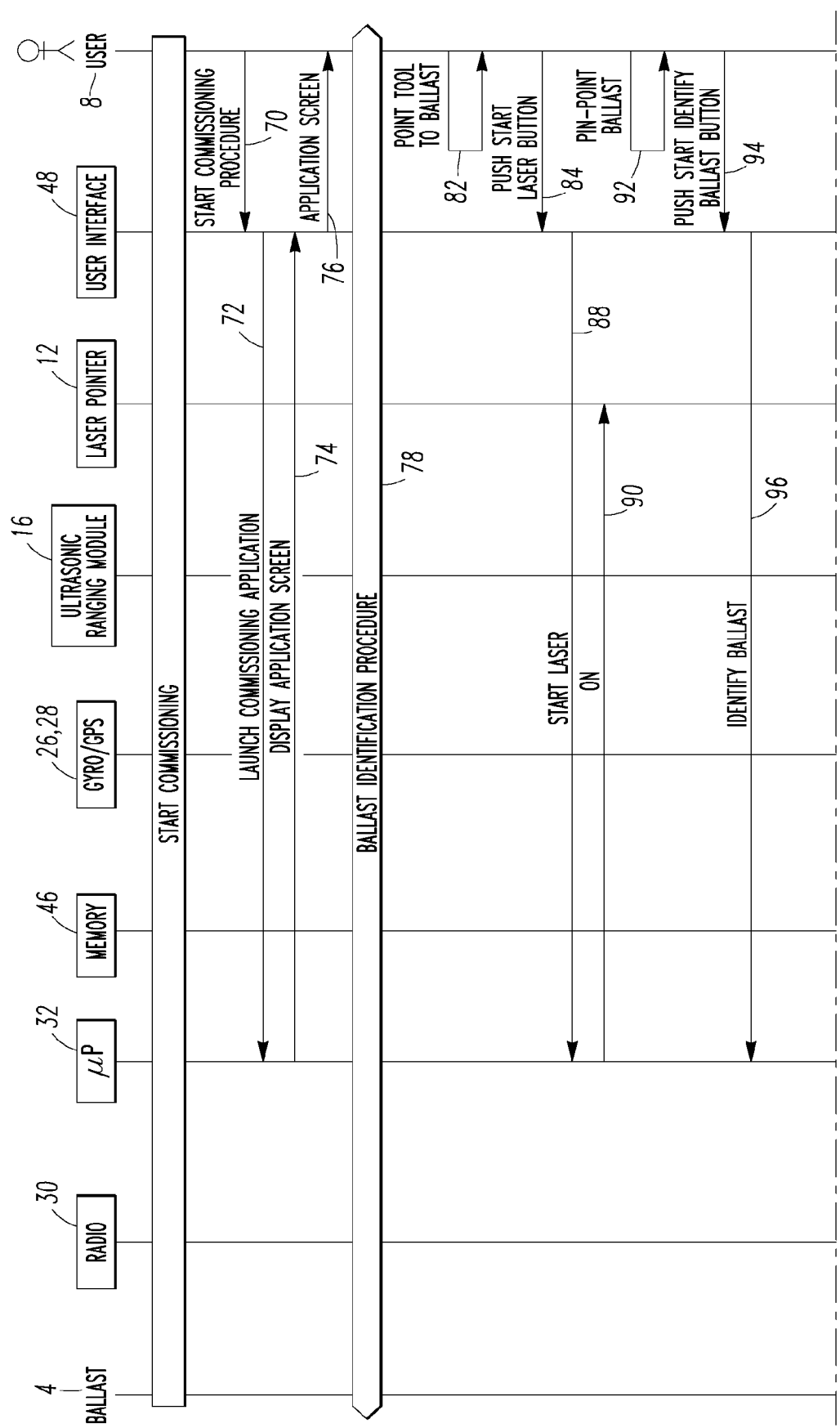
FIG. 3 is a sequence diagram of a commissioning procedure for use with the commissioning tool of FIG. 1.
Figure 3B:
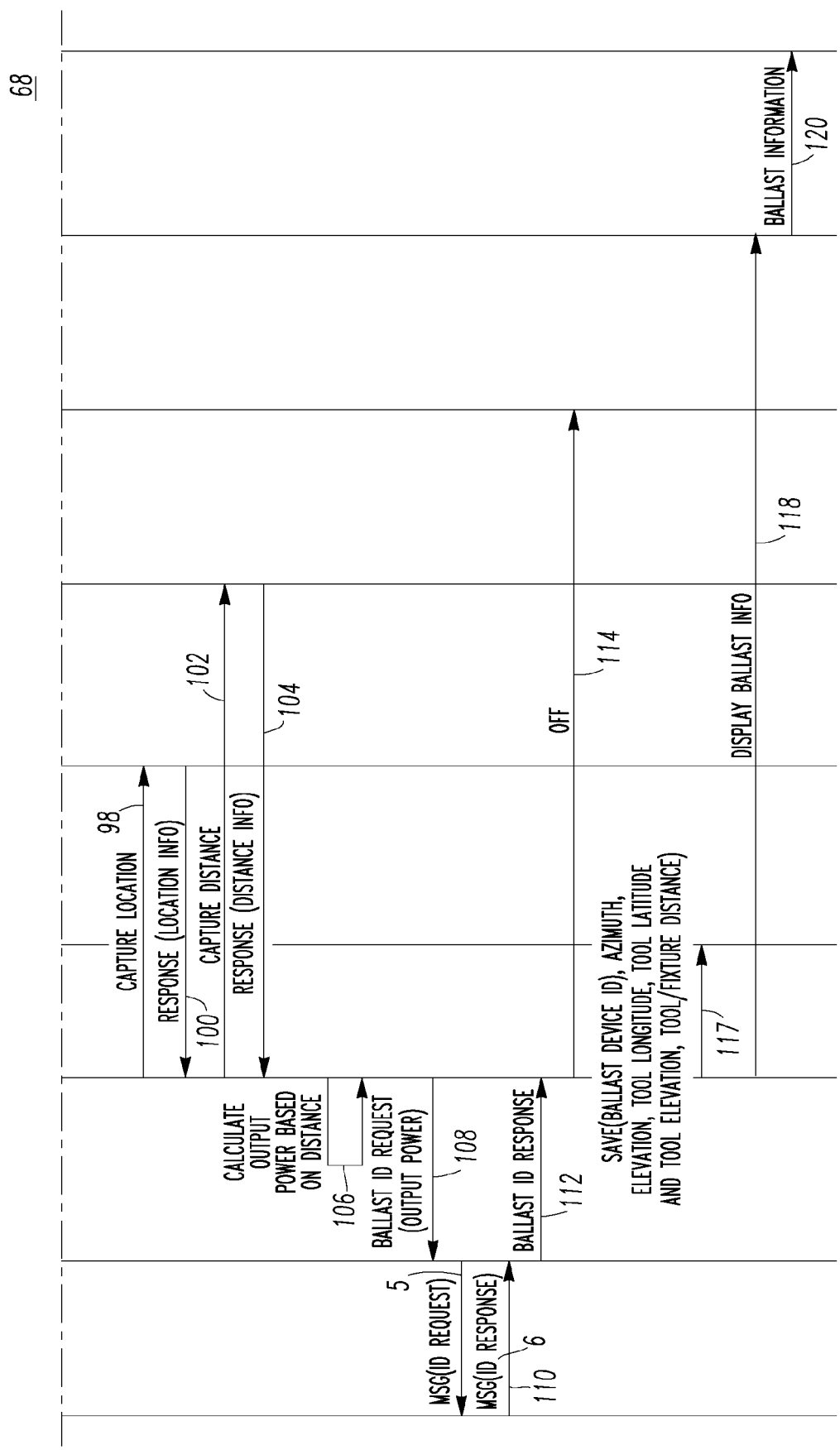
Figure 4A:
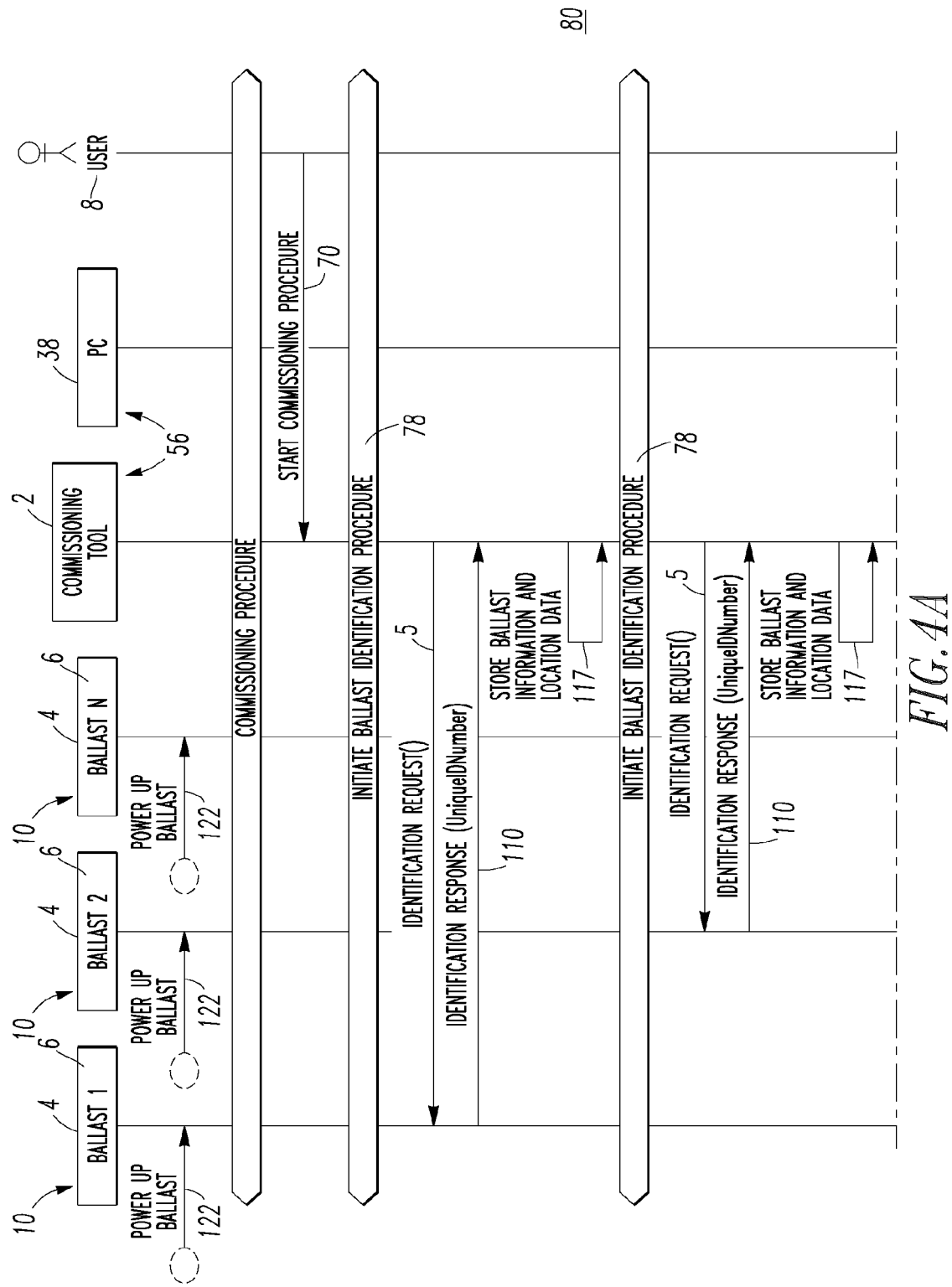
FIG. 4 is a sequence diagram of an overall commissioning procedure for use with the commissioning tool of FIG. 1 and the personal computer of FIG. 2.
Figure 4B:
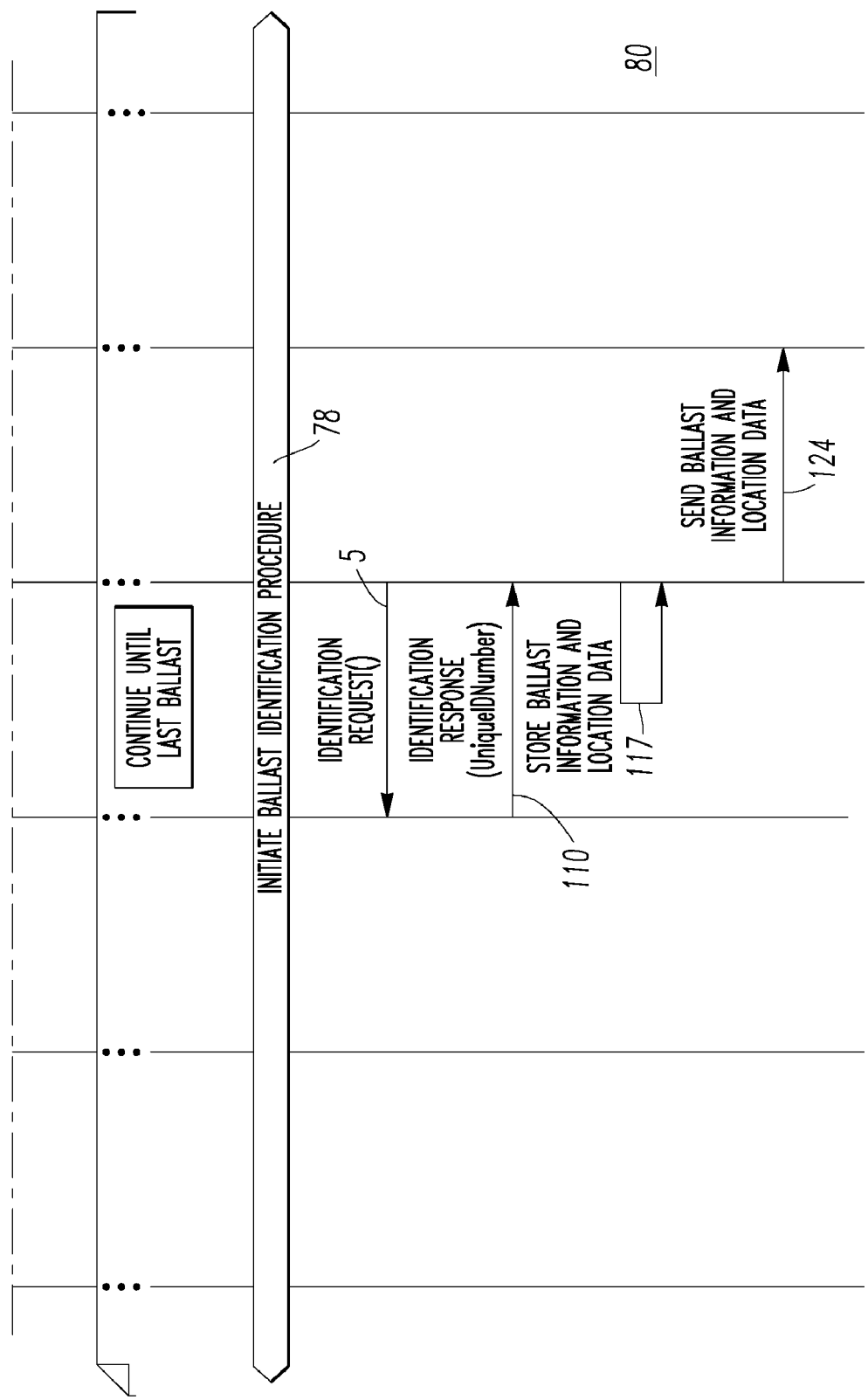

FIG. 3 shows a sequence diagram 68 of a commissioning procedure for use with the commissioning tool 2 of FIG. 1. First, the user 8 starts the commissioning procedure through a suitable input 70 to the user interface 48 of the commissioning tool 2. Next, the user interface 48 launches, at 72, a commissioning application 74 (FIG. 1) in the μP 32. Then, the μP 32 causes, at 74, the output of a suitable application screen 76 at the user interface 48, which, for example, displays the same to the user 8.

The following describes a ballast identification procedure 78, which is used by the overall commissioning procedure 80 of FIG. 4. First, the user 8 points, at 82, the commissioning tool 2 to the desired lighting fixture 10 (FIG. 4) (wireless lighting ballast 4) and presses, at 84, a start laser button 86 (FIG. 1). The user interface 48 sends a start laser signal 88 to the μP 32. Then, the μP 32 causes the output of an ON signal 90 to the laser pointer 12. Next, at 92, the user pin-points the laser light at the desired lighting fixture 10 (wireless lighting ballast 4) and, at 94, presses a start identify ballast button 96 (FIG. 1). Then, the user interface 48 sends an identify ballast signal 96 to the μP 32, which causes the output of a capture location signal 98 to the 3D gyroscope 26 and the GPS and dead reckoning system 28. These, in turn, respond with suitable location information 100 (e.g., without limitation, as is discussed below in connection with Example 13). Next, the μP 32 causes the output of a capture distance signal 102 to the ultrasonic ranging module 16, which, in turn, responds with suitable distance information 104. Then, the μP 32 calculates, at 106, the desired RF output power level for the radio 30 based upon the distance information 104 (e.g., without limitation, as is discussed below in connection with Examples 16-19). Next, the μP 32 outputs a ballast ID request 108 with the desired RF output power level to the radio 30. Then, the radio 30 responsively sends the wireless device ID request inquiry 5 to the selected wireless ballast 4, which responds with a corresponding wireless message 110 containing the corresponding device identifier (device ID 6) ID response. Next, the radio 30 sends a ballast ID response 112 to the μP 32. Then, the μP 32 causes the output of an OFF signal 114 to the laser pointer 12. At this point, upon seeing the laser light being turned off, the user 8 can stop pin-pointing the commissioning tool 2 at the desired lighting fixture 10 and concentrate on the display 116 (FIG. 1) of the user interface 48. Alternatively, or in addition, the user interface 48 may output a suitable sound, such as a tone, to the user 8. At the same time, the μP 32 saves, at 117, the ballast device ID 6, the tool/fixture azimuth, the tool/fixture elevation angle, the tool/ fixture distance, and the tool global position (longitude, latitude and elevation) to memory 46 (FIG. 1), and, also, causes, at 118, the output of this ballast ID and this location information to the user interface 48, which, for example, displays the same to the user 8 on the display 116 (FIG. 1), at 120. Alternatively, the unique ballast device ID 6 and the global position of the corresponding wireless lighting ballast 4 are displayed.

EXAMPLE 10

FIG. 4 shows a sequence diagram of the overall commissioning procedure 80 for use with the commissioning tool 2 of FIG. 1 and the PC 38 of FIG. 2. After power-up, at 122, of all of the wireless lighting ballasts 4 of interest, the user 8 starts the commissioning procedure at 70, as was discussed above in connection with FIG. 3. This causes the ballast identification procedure 78 of FIG. 3 to be executed for each of the wireless lighting ballasts 4 of interest. For example, after step 120 of FIG. 3, step 82 of FIG. 3 is repeated for the next wireless lighting ballast 4 of interest. For each of the wireless lighting ballasts 4 of interest, the identification request wireless message 5 is sent and the corresponding identification response wireless message 110 is received. After this, the corresponding ballast ID 6 and the corresponding location information is stored in the tool memory 46 at 117. After all of the ballast ID 6 and location information is determined for each of the wireless lighting ballasts 4 of interest, the ballast ID and location information is transferred, at 124, to the PC 38.

EXAMPLE 11

Non-limiting examples of the ultrasonic ranging module 16 include a Reliability Direct AR851 Ultrasonic Range Finder marketed by Reliability Direct, Inc. of League City, Tex.; and a 77-910- TLM 100 FatMax™ Tru-Laser™ Distance Measurer marketed by Stanley Tools Product Group of New Britain, Conn., although any suitable distance measuring device may be employed. These ultrasonic ranging modules, for example, may be readily modified to accept a capture distance signal 102 and to respond 104 (FIG. 3) with the distance to the selected object (e.g., wireless lighting ballast 4 or the corresponding lighting fixture 10).

EXAMPLE 12

One disadvantage of a conventional global positioning system (GPS) is that it typically requires a free-view of the sky and, thus, does not work very well indoors (e.g., without limitation, inside a commercial or industrial facility). The combination of a 3D gyroscope with GPS overcomes this limitation. The GPS is used to calibrate the current position on the Earth, while the 3D gyroscope is used to estimate the position after the satellite signal is lost through dead reckoning. Dead reckoning is a process of estimating current position based upon a previously determined position, or fix, and advancing that position based upon known speed, elapsed time and course.

An example of the GPS and dead reckoning system 28 is a DRM®-3 Dead Reckoning Module Engineering Tool marketed by Honeywell International Inc. of Minneapolis, Minn. The DRM®-3 provides continuous personnel position location with or without GPS. It is unaffected by urban canyons, nearby buildings, heavy foliage, or other situations which interfere with GPS. It also works inside many buildings. Another example is a DRM™4000 Dead Reckoning Module that provides accurate position information in places that GPS is unable to reach. This module includes ten sensors with three gyros, accelerometers and magnetometers as well a barometric altimeter to accurately deliver position location. Walking motion is analyzed and compensated for unique user kinematics. An internal Kalman filter integrates onboard sensors and external GPS data.

EXAMPLE 13

The location and position of the commissioning tool 2 is determined from the 3D gyroscope 26 and the GPS and dead reckoning system 28. The GPS and dead reckoning system 28 provides the global position (longitude, latitude and elevation) of the commissioning tool 2. The 3D gyroscope 26 provides the azimuth angle and elevation angle of the common orientation defined by the lines 20, 22 and 24 from the first mechanism 16, the laser pointer 12 and the directive antenna 14 of FIG. 1, respectively, which point toward the selected wireless lighting ballast 4. Suitable mathematics to relate these and the commissioning tool/wireless lighting ballast distance to the global position (longitude, latitude and elevation) of the wireless lighting ballast 4 are as follows:

After the initial calibration using GPS and the use of dead reckoning, the location of the commissioning tool 2 is determined while discovering individual wireless lighting ballasts 4. After the location of the tool 2 is known, with the information of the pointing azimuth angle, pointing elevation angle, and distance (from the ultrasonic ranging module 16), the global position of the selected wireless lighting ballast 4 is determined. These calculations may be embodied in one or both of the μP 32 and the PC 38.

Figure 5:
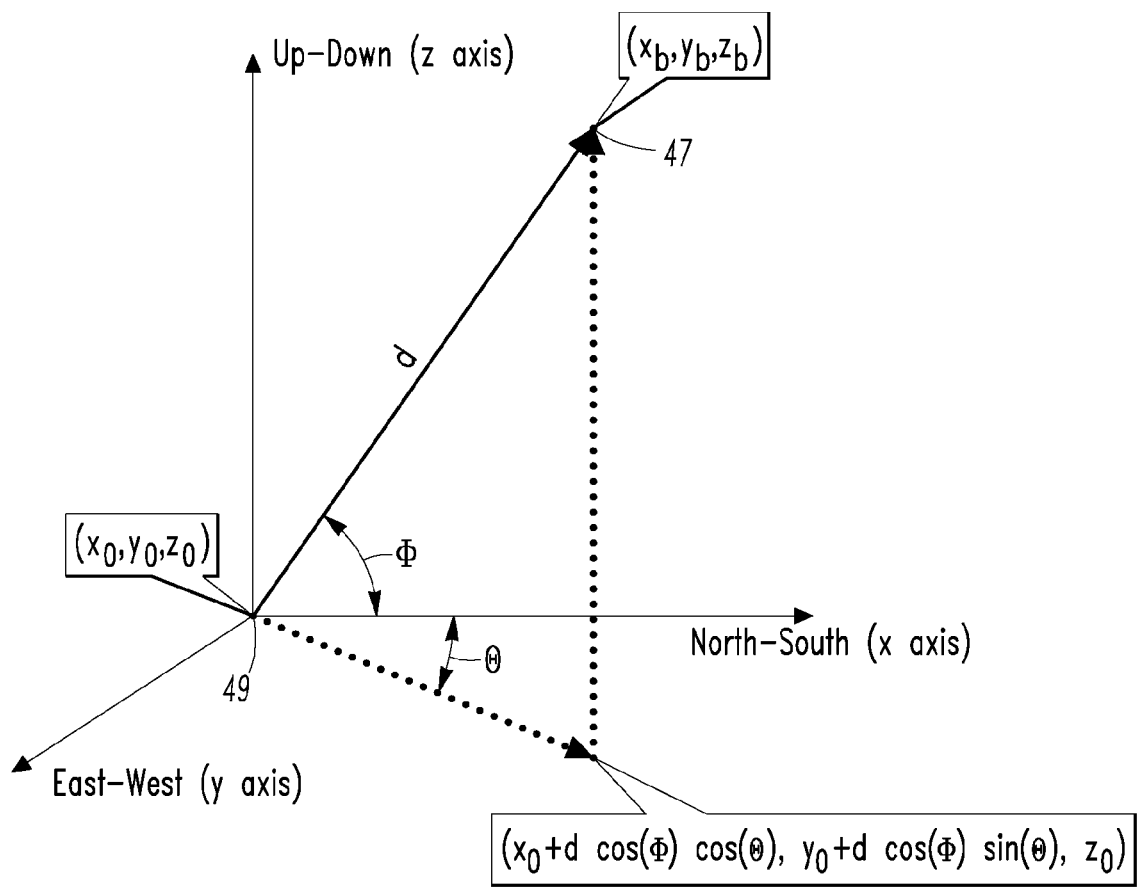
FIG. 5 is a diagram showing the relative position of a lighting ballast with respect to the commissioning tool of FIG. 1.

For example, as shown in FIG. 5, the wireless node's position 47 ($x_b$, $y_b$, $z_b$), may be determined by the commissioning tool 2 from its position 49 ($x_0$, $y_0$, $z_0$) and Equation 2:

$$(x_b, y_b, z_b) = (x_0 + d\cos(\Phi)\cos(\theta), y_0 + d\cos(\Phi)\sin(\theta), z_0 + d\sin(\Phi)) \quad \text{(Eq. 2)}$$

wherein:
d is distance from the commissioning tool 2 to the wireless node 4 (e.g., without limitation, as obtained using ultrasound distance and/or RSSI/PER (e.g., the received signal strength indicator (RSSI) decreases as the distance increases) estimation by the ultrasonic ranging module 16);
θ is azimuth angle (e.g., without limitation, as obtained by the 3D gyroscope 26); and
Φ is elevation angle (e.g., without limitation, as obtained by the 3D gyroscope 26).

EXAMPLE 14

The Sensor Network Analyzer (SNA) routine 50 of FIG. 3 is a software tool marketed by Daintree Networks, Inc. of San Jose, Calif. The SNA routine 50 tests and analyzes wireless communications of a wireless sensor network and provides commissioning capabilities. After all of the wireless nodes (wireless lighting ballasts 4) are discovered, the collected information (e.g., without limitation, node device ID; node location) is sent to the SNA routine 50. Combined with a building drawing/floor plan, the SNA routine 50 matches the node location on the floor plan with the actual node device ID collected by the commissioning tool 2. Since the node device ID and the node location are known, the commissioning and binding of functions is significantly simplified and may be done automatically.

The following Examples 15-19 explain output power based on distance.

EXAMPLE 15

For example, the greater the distance, the more power is needed for reliable wireless communication. One purpose of regulating RF output power is to limit the communication distance. While this, also, conserves battery power, limiting the communication range limits the count of wireless lighting ballasts 4 that the commissioning tool 2 can potentially communicate with.

EXAMPLE 16

The commissioning tool 2 includes the directive antenna 14 to preferably focus the wireless communication to a single wireless lighting ballast 4 or relatively very few such ballasts 4. One of the properties of the directive antenna 14 is that it has a gain, which extends its practical communication range in the direction being pointing at by the directive antenna 14. For example, the directive antenna 14 may be employed in the 2.4 GHz ISM band and may be a circuit board trace antenna, which has a horizontal and vertical beam width of 25° and a gain of 14 dBi.

EXAMPLE 17

Given the distance between the commissioning tool 2 and the wireless lighting ballast 4 to be discovered (e.g., using the ultrasonic ranging module 16) and the typical sensitivity of the receiver of the radio 30, the required transmit power of the radio transmitter may be calculated using an RF path loss model. An example RF path loss model is the free-space path loss model of Equation 1.

$$\text{Att(dB)} = 20 * \log((4\pi * d * f)/c) \quad \text{(Eq. 1)}$$

wherein:
Att(dB) is attenuation (dB)
d is distance (meters);
f is frequency (Hertz); and
c is the speed of light.
Equation 1 can be used to calculate the attenuation at a certain distance between a transmitter and a receiver at a given operating frequency.

EXAMPLE 18

For a frequency (f) of 2.4 GHz and a distance (d) of 10 m, the attenuation, using the free-space path loss model of Equation 1, is about 60 dB. If the receive sensitivity for a wireless receiver (of the radio 30) is −92 dBm, the gain of the directive antenna 14 is 14 dB, then the output power for successful wireless communications is at least −46 dBm (=−92 dBm+60 dB−14 dB).

EXAMPLE 19

The output power of the wireless transmitter (of the radio 30), without amplification, is 0 dBm, which equals 1 mW. An output power of −46 dBm (from Example 18) equals 25 nW. Hence, there is room to limit the output power in order to limit the wireless communication distance and, thus, the count of wireless lighting ballasts 4 that the commissioning tool 2 can communicate with.

EXAMPLE 20

The real-time fixture (RTF) map 58 is a floor plan in electronic format. The floor plan preferably shows the building layout and the location of the lighting fixtures 10. The SNA routine 50 maps the electronic floor plan with the wireless lighting ballast information and location received from the commissioning tool 2 and uses this information to commission the wireless communication network.

EXAMPLE 21

In Equation 2, $x_0$ and $x_b$ are latitude coordinates (e.g., expressed in decimal degrees instead of degrees|minutes|seconds or converted to distance, such as meters) and $y_0$ and $y_b$ are longitude coordinates. In some applications, an arbitrary "zero point" may be defined, such as position 49 ($x_0$, $y_0$, $z_0$), with distance being measured from that point. The 3D gyroscope 26 may provide a conversion directly in distance (e.g., meters), rather than in terms of latitude/longitude. The position 49 may be that of the commissioning tool 2 or any other suitable reference point.

For example, the latitude difference ($x_0 - x_b$) may be measured in degrees or distance (e.g., meters). If, for example, meters are desired, then the latitude difference in meters would be equal to the latitude difference in decimal degrees× 111,300 m/deg. Similarly, the longitude difference ($y_0 - y_b$) may be measured in degrees or distance (e.g., meters). Again, if meters are desired, then the longitude difference in meters (e.g., without limitation, near 40° N latitude) would be equal to the longitude difference in decimal degrees×85,300 m/deg. Those skilled in the art can perform this conversion at any suitable latitude.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A commissioning tool for a number of wireless nodes, each of said number of wireless nodes having a unique device identifier, said commissioning tool comprising:
    a light source structured to reflect light from one of said number of wireless nodes;
    a directive antenna;
    a first mechanism structured to determine distance to said one of said number of wireless nodes;
    a housing, said light source, said directive antenna and said first mechanism each being mounted in the same common orientation with respect to said housing;
    a second mechanism structured to determine azimuth angle and elevation angle of said same common orientation;
    a third mechanism structured to determine global position of said commissioning tool;
    a wireless transceiver cooperating with said directive antenna; and
    a processor cooperating with said wireless transceiver to receive the unique device identifier from said one of said number of wireless nodes, said processor being structured to receive said distance to said one of said number of wireless nodes from said first mechanism, to receive said azimuth angle and said elevation angle from said second mechanism, to receive the global position of said commissioning tool from said third mechanism, and to control said light source.

2. The commissioning tool of claim 1 wherein said processor comprises a routine structured to determine the global position of said one of said number of wireless nodes from said distance to said one of said number of wireless nodes from said first mechanism, said azimuth angle and said elevation angle from said second mechanism, and said global position of said commissioning tool from said third mechanism.

3. The commissioning tool of claim 2 wherein the global position of said one of said number of wireless nodes includes a longitude, a latitude and an elevation of said one of said wireless nodes.

4. The commissioning tool of claim 2 wherein said processor further comprises an output; and wherein said routine is further structured to output the unique device identifier and the global position of said one of said number of wireless nodes to the output of said processor.

5. The commissioning tool of claim 4 wherein the output of said processor is structured to interface another processor.

6. The commissioning tool of claim 4 wherein the output of said processor is a display.

7. The commissioning tool of claim 1 wherein the global position of said commissioning tool includes a longitude, a latitude and an elevation of said commissioning tool.

8. The commissioning tool of claim 1 wherein said directive antenna is a superdirective radio frequency antenna.

9. The commissioning tool of claim 1 wherein said processor comprises a routine structured to control radio frequency power transmitted by said wireless transceiver to said directive antenna as a function of said distance to said one of said number of wireless nodes.

10. The commissioning tool of claim 1 wherein said processor comprises a user interface including a first input structured to cause said processor to energize said light source and a second input structured to cause said processor to receive the unique device identifier from said one of said number of wireless nodes, receive said distance to said one of said number of wireless nodes from said first mechanism, receive said azimuth angle and said elevation angle from said second mechanism, and receive the global position of said commissioning tool from said third mechanism.

11. The commissioning tool of claim 10 wherein said user interface further includes a display structured to display the unique device identifier and the global position of said one of said number of wireless nodes.

12. The commissioning tool of claim 1 wherein said light source is a laser guide.

13. A commissioning tool for a number of wireless nodes, each of said number of wireless nodes having a unique device identifier, said commissioning tool comprising:
    a light source structured to reflect light from one of said number of wireless nodes;
    a directive antenna;
    a first mechanism structured to determine distance to said one of said number of wireless nodes;
    a housing, said light source, said directive antenna and said first mechanism each being mounted in the same common orientation with respect to said housing;
    a second mechanism structured to determine azimuth angle and elevation angle of said same common orientation;
    a third mechanism structured to determine global position of said commissioning tool;
    a wireless transceiver cooperating with said directive antenna; and
    a processor cooperating with said wireless transceiver to receive the unique device identifier from said one of said number of wireless nodes, said processor being structured to receive said distance to said one of said number of wireless nodes from said first mechanism, to receive said azimuth angle and said elevation angle from said second mechanism, to receive the global position of said commissioning tool from said third mechanism, and to control said light source,
    wherein said first mechanism is an ultrasonic ranging module; wherein said second mechanism is a 3D gyroscope; and wherein said third mechanism is a GPS and dead reckoning system.

14. A commissioning system for a plurality of wireless nodes, each of said wireless nodes having a unique device identifier, said commissioning system comprising:
    a commissioning tool comprising:
        a light source structured to reflect light from one of said wireless nodes,
        a directive antenna,
        a first mechanism structured to determine distance to said one of said wireless nodes,
        a housing, said light source, said directive antenna and said first mechanism each being mounted in the same common orientation with respect to said housing,
        a second mechanism structured to determine azimuth angle and elevation angle of said same common orientation,
        a third mechanism structured to determine global position of said commissioning tool, a wireless transceiver cooperating with said directive antenna, a first processor cooperating with said wireless transceiver to receive the unique device identifier from said one of said wireless nodes, said first processor being structured to receive said distance to said one of said wireless nodes from said first mechanism, to receive said azimuth angle and said elevation angle from said second mechanism, to receive the global position of said commissioning tool from said third mechanism, and to control said light source, and an output; and a second processor comprising:

an input cooperating with the output of said commissioning tool to input the unique device identifier and the global position of said one of said wireless nodes, and a memory including the unique device identifier and the global position of each of a plurality of said wireless nodes.

15. The commissioning system of claim 14 wherein said second processor is a personal computer.

16. The commissioning system of claim 14 wherein said first processor is a microprocessor.

17. The commissioning system of claim 14 wherein said second processor further comprises a sensor network analyzer routine.

18. The commissioning system of claim 14 wherein the global position of said one of said wireless nodes is defined by said distance to said one of said wireless nodes, said azimuth angle and said elevation angle, and said global position of said commissioning tool; wherein said first processor is structured to output to the output of said first processor said distance to said one of said wireless nodes, said azimuth angle and said elevation angle, and said global position of said commissioning tool; and wherein said second processor further comprises a routine structured to determine a global position of said one of said wireless nodes from said distance to said one of said wireless nodes, said azimuth angle and said elevation angle, and said global position of said commissioning tool.

19. The commissioning system of claim 14 wherein said directive antenna is a superdirective radio frequency antenna.

20. The commissioning system of claim 14 wherein said first processor comprises a routine structured to control radio frequency power transmitted by said wireless transceiver to said directive antenna as a function of said distance to said one of said number of wireless nodes.

21. A method of commissioning a number of wireless nodes, each of said number of wireless nodes having a unique device identifier, said method comprising:

mounting each of a light source, a directive antenna and a ranging mechanism in the same common orientation with respect to a portable housing;

reflecting light from one of said number of wireless nodes with said light source;

determining distance to said one of said number of wireless nodes with said ranging mechanism;

determining azimuth angle and elevation angle of said same common orientation;

determining global position of said portable housing;

requesting and receiving the unique device identifier from said one of said number of wireless nodes through said directive antenna; and outputting said distance to said one of said number of wireless nodes, said azimuth angle and said elevation angle, said global position of said portable housing, and said unique device identifier from said one of said number of wireless nodes.

22. The method of claim 21 further comprising displaying said distance to said one of said number of wireless nodes, said azimuth angle and said elevation angle, said global position of said portable housing, and said unique device identifier from said one of said number of wireless nodes.

23. The method of claim 21 further comprising inputting to a personal computer said distance to said one of said number of wireless nodes, said azimuth angle and said elevation angle, said global position of said portable housing, and said unique device identifier from said one of said number of wireless nodes.

* * * * *